May 13, 1930. M. BLAGÉ 1,758,823
INGOT MOLD
Filed Jan. 12, 1929 2 Sheets-Sheet 1

Inventor:
Marcel Blagé
by Richard E. Babcock
Attorney

May 13, 1930.  M. BLAGÉ  1,758,823
INGOT MOLD
Filed Jan. 12, 1929   2 Sheets-Sheet 2
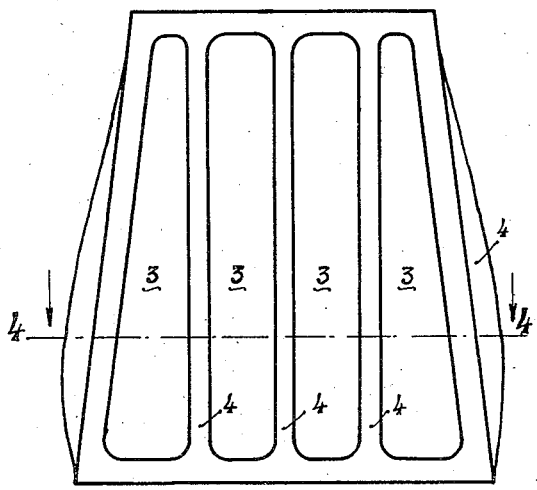
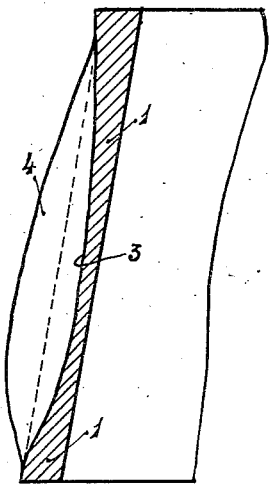
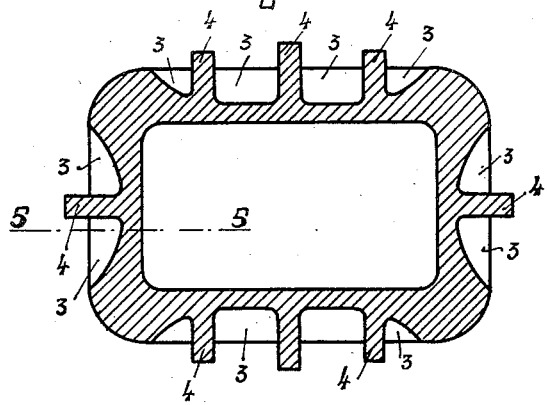
Inventor:
Marcel Blagé
by Richard E. Babcock
Attorney Patented May 13, 1930

1,758,823

UNITED STATES PATENT OFFICE

MARCEL BLAGÉ, OF VIREUX-MOLHAIN, FRANCE

INGOT MOLD

Application filed January 12, 1929, Serial No. 332,184, and in France January 20, 1928.

This invention relates to ingot molds and its object is to so construct or shape such molds as to expedite their rate of cooling when filled with fused metal.

It is well known to provide ingot molds with walls of varying thickness and also to provide the walls of ingot molds with fins or indentations for rapid cooling, but such molds are not satisfactory in that they are not intended to afford, nor capable of affording, a uniform cooling of the content of the mold nor a corresponding resistance of the mold.

The present invention provides for the rapid and uniform cooling of ingot molds by reducing the thickness of the walls thereof at the zones or areas where they conduct and radiate the maximum amount of heat and this is carried out by constructing the molds so that the external faces of their walls are concave both in vertical and in horizontal section.

Moreover, according to the present invention, in order that such reduction of the thickness of the walls will not detrimentally effect the strength of the mold, the thinned walls may be provided with strengthening supports or ribs, which ribs are, preferably and advantageously, so shaped that they cause the thinned parts of the walls to possess the same strength as the thicker parts and also cause a uniform cooling of the metal.

Besides the cooling advantages thus obtained, such advantages simultaneously preserving the good condition of the mold, the present invention enables the said molds to be made considerably lighter and cheaper than has been possible up to the present and also enables them to be made of steel, thereby considerably increasing their period of use.

The present invention is applicable to all kinds of molds, especially to large capacity molds and to molds used for producing ingots for the manufacture of sheet iron.

The accompanying drawings show, by way of example, two methods of constructing ingot molds according to the present invention.

Figure 3 shows an elevation of a mold constructed according to the second method.

Figure 4 is a horizontal section along line 4—4, Figure 3.

Figure 5 is a vertical section along line 5—5, Figure 4.

Figure 1:
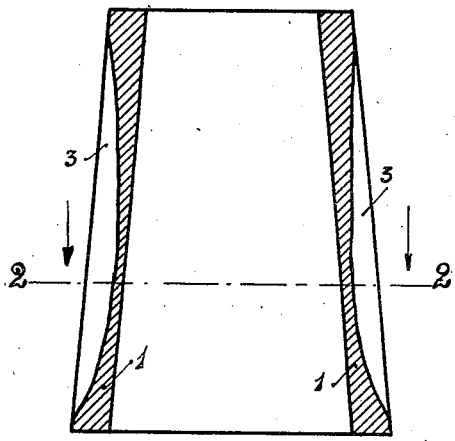
Figure 1 is a vertical section along line 1—1, Figure 2, according to the first method of construction.
Figure 2:
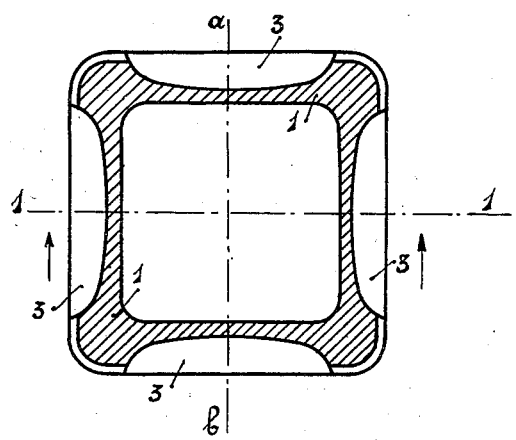
Figure 2 is a horizontal section along line 2—2 Figure 1.

Referring to Figures 1 and 2, it must first of all be mentioned that the maximum amount of heat conducted and radiated by the walls 1 of the ingot mold must be approximately in the zones adjacent the points of intersection of the horizontal plane corresponding to line 2—2 of Fig. 1 by the vertical planes corresponding to the lines 1—1 and a—b of Fig. 2, because the radiation of heat by the walls of the ingot mold at the upper part of the latter will be less, partly because of the proximity of the top opening of the ingot mold and partly because of the decreased amount of fused material present, it will also be less at the lower part of the mold because of the proximity of the plate supporting the ingot mold and it will be equally diminished at the corners because of the approach of the adjacent walls of the ingot-mold.

Hence the walls 1 of the ingot mold have, according to the present invention, a section which becomes thinner and thinner as it approaches the said points of intersection of said planes, as mentioned above.

This is advantageously effected by forming each of the external walls 1 with an outer face concave in both a vertical and a horizontal direction for substantially its full area following suitable curves or straight lines as shown by way of example at 3 in Figures 1 and 2.

Referring to Figures 3, 4 and 5, the walls 1 of the ingot mold, hollowed or thinned as described above are formed with reinforcements or ribs 4. These ribs may be shaped, and may be located and distributed in any desired manner. According to the example of realization shown in Figures 3 to 5, said ribs have a section which, so to speak, is inverse to that of the walls of the ingot-mold, and have a depth which increases proportionally, or nearly so, with the depth of the cavities 3, that is to say, their degree of convexity is in proportion to the degree of concavity of the walls of the mold.

It can easily be understood that in an ingot-mold according to the present invention, the suitable thinning of the walls of the ingot mold described above is in order to ensure that the conduction and radiation of heat by the walls will be effected more rapidly where such conduction and radiation are necessary and because of the presence of the reinforcing ribs the strength of the ingot-mold will not be reduced.

It is obvious that the object of the present invention can assume a large number of variations in execution without departing from said object of the present invention described above.

Having now particularly described and ascertained the nature of my said invention and in what manner the same is to be performed, I declare that what I claim is:—

1. An ingot mold having walls having external surfaces which are concave both vertically and horizontally, said walls forming corners at their points of merging with each other, the external faces of said corners being straight in a vertical direction, and each of said corners being of substantially the same cross-sectional area at all points throughout its height.

2. An ingot mold according to claim 1, provided with exterior bracing ribs of such configuration and dimensions as to impart to the thinned parts of the walls the same strength as possessed by the thicker parts thereof and also to cause an uniform cooling of the cast metal at all points.

3. An angular ingot mold having external surfaces which are concave both in horizontal and in vertical section, the center of the vertical concave and the center of the horizontal concave coinciding.

4. An ingot mold having walls each having external surfaces which are concave both vertically and horizontally.

5. An angular ingot mold having a plurality of external vertically extending surfaces each of which is concave both in horizontal and in vertical section.

MARCEL BLAGÉ.